(12) United States Patent
Hansen

(10) Patent No.: US 7,177,790 B2
(45) Date of Patent: Feb. 13, 2007

(54) METHOD AND APPARATUS FOR PROVIDING VIRTUAL DEVICES

(75) Inventor: Peter A. Hansen, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 707 days.

(21) Appl. No.: 10/293,679

(22) Filed: Nov. 13, 2002

(65) Prior Publication Data

US 2004/0093373 A1    May 13, 2004

(51) Int. Cl.
    *G06F 9/455* (2006.01)
(52) U.S. Cl. .................. 703/24; 709/201; 709/202; 709/203; 709/204; 709/208; 709/212; 709/213; 709/217; 709/220; 709/223; 709/227; 709/230; 709/231; 709/214; 709/215; 709/216; 713/1; 713/2
(58) Field of Classification Search .......... 709/226, 709/225, 203, 207, 220; 703/23; 713/1; 714/2
    See application file for complete search history.

(56) References Cited

U.S. PATENT DOCUMENTS

| 5,146,568 | A | 9/1992 | Flaherty et al. |
|---|---|---|---|
| 5,280,627 | A | 1/1994 | Flaherty et al. |
| 6,292,890 | B1 | 9/2001 | Crisan |
| 6,324,644 | B1 * | 11/2001 | Rakavy et al. ............... 713/1 |
| 2002/0026491 | A1 * | 2/2002 | Mason et al. ............... 709/207 |
| 2002/0156612 | A1 * | 10/2002 | Schulter et al. ............. 703/23 |
| 2002/0156613 | A1 * | 10/2002 | Geng et al. ................. 703/23 |
| 2002/0194251 | A1 * | 12/2002 | Richter et al. .............. 709/105 |
| 2003/0046396 | A1 * | 3/2003 | Richter et al. .............. 709/226 |
| 2003/0126260 | A1 * | 7/2003 | Husain et al. .............. 709/225 |
| 2005/0182854 | A1 * | 8/2005 | Pinketon et al. ............ 709/238 |
| 2005/0240665 | A1 * | 10/2005 | Gu et al. .................... 709/220 |
| 2005/0267935 | A1 * | 12/2005 | Gandhi et al. .............. 709/203 |
| 2005/0273644 | A1 * | 12/2005 | Herley et al. ................ 714/2 |

* cited by examiner

*Primary Examiner*—Kamini Shah
*Assistant Examiner*—Cuong Van Luu

(57) ABSTRACT

A system and method for downloading over a network operating systems or other executable programs to a computer that may not have a boot device or other device containing the executable program. The computer may boot in real mode and transfer data packets using a UDP protocol. The computer may virtualize disk requests and encapsulate them as UDP packets as required or useful.

20 Claims, 4 Drawing Sheets

METHOD AND APPARATUS FOR PROVIDING VIRTUAL DEVICES

BACKGROUND

Server computers are utilized extensively today to provide for, among other uses, centralized or distributed storage repositories for applications software and the other software. Often, a server computer is utilized in a network environment to provide these applications and other software to other computers that may be interconnected through the network. This type of arrangement is particularly efficient for downloading common applications that may be utilized by a variety of different computers from one conveniently serviced server computer.

Today, it is not uncommon for a large number of server computers to be physically mounted within a single computer rack that may be many feet tall. In the interest of space and economics, it would be helpful if each of the servers within the rack was able to provide the equivalent of a standalone server computer including the variety of physical devices that may be attached thereto. For example, a standalone server may well include a disk drive, CD ROM drive, DVD ROM drive, or other such storage devices that may be accessed by users of the server computer.

However, when multiple server computers are mounted within a single rack, it is highly desirable to eliminate redundant devices, such as disk drives that may be utilized in the boot up process to load an operating system onto the server computer. The industry today has pushed the limits of density such that the functionality of a standalone server computer has been integrated onto a single plug-in card. These cards, often called "server blades," allow for extremely high density computing resources within a single rack enclosure. This relatively high density of servers has also accelerated the desire to eliminate bulky hardware to a greater degree.

The present invention may address one or more of the above issues.

BRIEF DESCRIPTION OF THE DRAWINGS

This invention is pointed out with particularity in the appended claims. The advantages of the present invention may be better understood by referring to the following description taken in conjunction with the accompanying drawings in which:

DETAILED DESCRIPTION

A computer, including a server computer, includes both the physical hardware and the instructions which may cause the physical machine to perform functions, namely the software. Software may be generally considered to be application software or system software. A program that controls the hardware of the computer and the execution of application programs is generally called system software. This system software may typically include the operating system, which may be the program which controls the actual computer or central processing unit (CPU) and associated device drivers, which may control the input and output devices (I/O), such as printers, keyboards, disk drives, and other such input/output devices.

A typical operating system is too large to be stored in the limited amount of read only memory that may be available in typical computer systems. Therefore, most computer systems utilize a small program to start the computer, which may then be utilized to load additional software, so that the computer may boot an operating system. This small software may be considered a BIOS, which is typically referred to as the basic input/output system. In many computers, the BIOS is stored in a ROM and it begins executing on power up or reset of the associated computer. The BIOS may, among other functions, begin reading one or more sectors from a storage device such as a floppy disk, hard disk, or CD ROM. The data on the storage device may be subsequently utilized to load into the computer memory an operating system which may be stored on a disk drive.

Server computers may typically be connected to one or more networks, such as a local area network (LAN), wide area network (WAN), or other network. These networks facilitate the transfer of data between computers that may be connected to one or more of the networks. One advantage of a network architecture is that software on the server may be shared between many computers as needed. From a service standpoint, serviceability may be enhanced as only one copy of a particular piece of software may need to be maintained instead of, for example, having a copy of a particular piece of software or multiple computers, each of which may need to be maintained.

Figure 1:
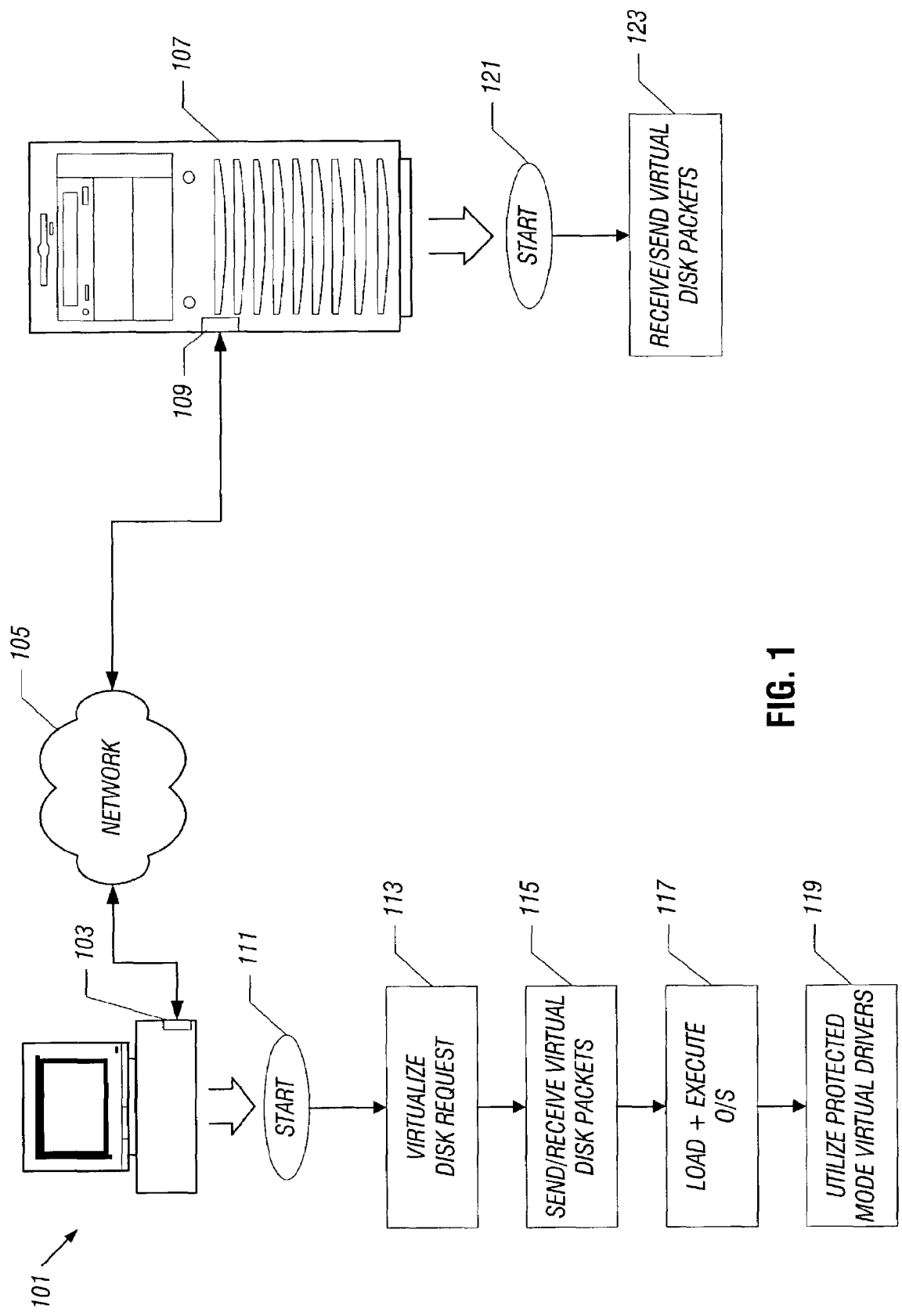
FIG. 1 illustrates a computer system in accordance with embodiments of the present invention.

Referring now to FIG. 1, a computer 101 may include a network interface 103. This network interface 103 may be compatible with one or more network standards and may be convenient to connect the computer 101 to a network such as network 105. This network 105 may be any convenient network such as, for example, a LAN, WAN, or other network.

A host computer 107 may also be connected to the network 105 through a network interface 109. The network interface 109 may be any interface that may be convenient or useful to interface with the network 105.

Computer 101 may, in some embodiments, not include a storage device containing an operating system. In such a case, a computer 101 may need to receive the necessary operating system or other program from a host device such as host computer 107. The host computer 107 may be considered a server computer in that it may serve to host one or more programs such as an operating system for downloading to other computers such as computer 101.

Upon boot up, computer 101 may start a boot process 111, which may include virtualizing a disk request 113. The disk request may be considered virtualized, as computer 101 may not have the device and, therefore, may need to have some other mechanism such that computer 101 may still boot an operating system as required.

Once the disk request is virtualized 113, the computer 101 may send or receive virtual disk packets 115 through network interface 103 through the network 105 to the host computer 107. Computer 101 may receive virtual disk packets 115 from host computer 107, as may be required or useful, such that computer 101 may load and execute an operating system 117. In some embodiments, once the operating system is executed and running (booted), the operating system may typically run in a protected mode and utilize virtual drivers associated with the operating system such as, for example, 32 bits device drivers. Until the protected mode operating system is booted, the processor (not shown) associated with the computer 101 typically operates in "real" mode. Real mode refers to the mode of operation an Intel X86 series microprocessor, and many successors there to, begins operating in when first powered on or reset. This mode may be considered 16-bit mode.

Host computer 107 may start a process 121 to receive and send virtual disk packets 123 to computers interconnected to the network 105, such as computer 101. Host computer 107 may handle the virtual disk packets in a number of different ways. For example, in some embodiments, host computer 107 may convert the virtual disk packets into physical read and write commands to one or more physical storage devices associated with the host computer 107, such as a hard disk drive or other storage device. In some embodiments, host computer 107 may emulate in random access memory or other storage memory, a physical disk drive and read or write information to that emulated storage drive in response to receiving or sending the virtual disk packets 123.

Figure 2:
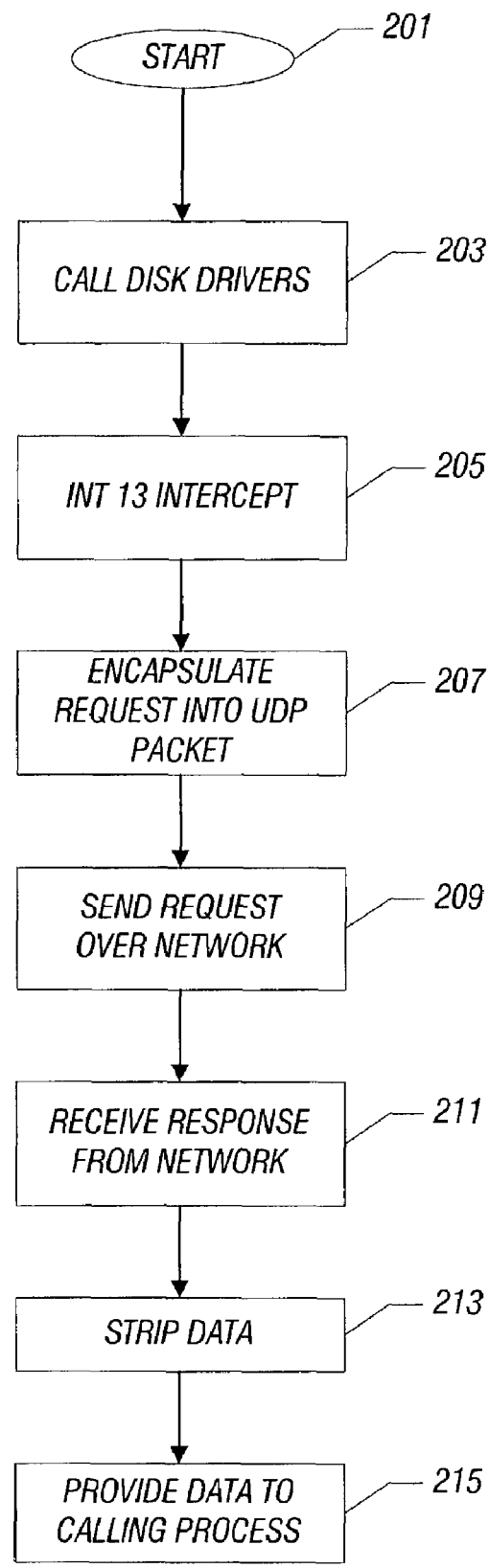
FIG. 2 illustrates a virtual device flow chart in accordance with embodiments of the present invention.

Referring now to FIG. 2, computer 101 may start executing a process 201 to provide for virtual disk or other storage. The process may call disk drivers 203, which may be stored in a ROM or other such storage device that may also contain the BIOS. The call to disk drivers 203 may cause the computer system 101 to jump to a particular location in a vector table. One such location may be referred to as BIOS interrupt 13 (hexadecimal) which, in some embodiments, may point to disk drivers utilized in a boot process or other process. By intercepting the interrupt 13 (hexadecimal) request 205, the computer may be directed to execute particular software drivers that may be utilized to virtualize disk read and write requests.

The virtual disk requests may then be encapsulated 207 into a User Datagram Protocol (UDP) packet. A UDP protocol is a protocol that sends independent packets of data, called datagrams, from one computer to another computer. A UDP protocol may be considered a transport layer of a network system. The UDP drivers may be stored in a Preboot Execution Environment (PXE) ROM (not shown) that may be coupled to a processor in the computer 101 and consistent with the Preboot Execution Environment Specification, Intel Corporation, Version 2.1, Sep. 20, 1999, incorporated herein by reference. The UDP drivers may also be stored in another ROM or storage device.

Once the virtual requests have been encapsulated into a UDP packet 207, they may be sent over a network 209 such as network 105. Encapsulation in this context means adding any required or useful header or other information to the data to conform to the UDP protocol. Subsequently, computer 101 may receive a response from the network 211, such as network 105, that may have come from a host computer such as host computer 107. Computer 101 may then strip the virtual requests from the UDP packet 213 and provide the data that was stripped from the packet to the calling process 215, such as the process that called the disk drivers 203.

The process illustrated in FIG. 2, may allow computer 101 to access a physical or emulated disk on a host computer such as host computer 107. This may, in some embodiments, eliminate the need for computer 101 to have a physical disk drive or other storage device containing a particular operating system such as, for example, a protected mode operating system. Examples of protected mode operating systems include, but are not limited to, Windows 98, NT version 4.0, Windows XP Professional and Windows 2000 distributed by Microsoft corporation of Redmond, Wash.

Figure 3:
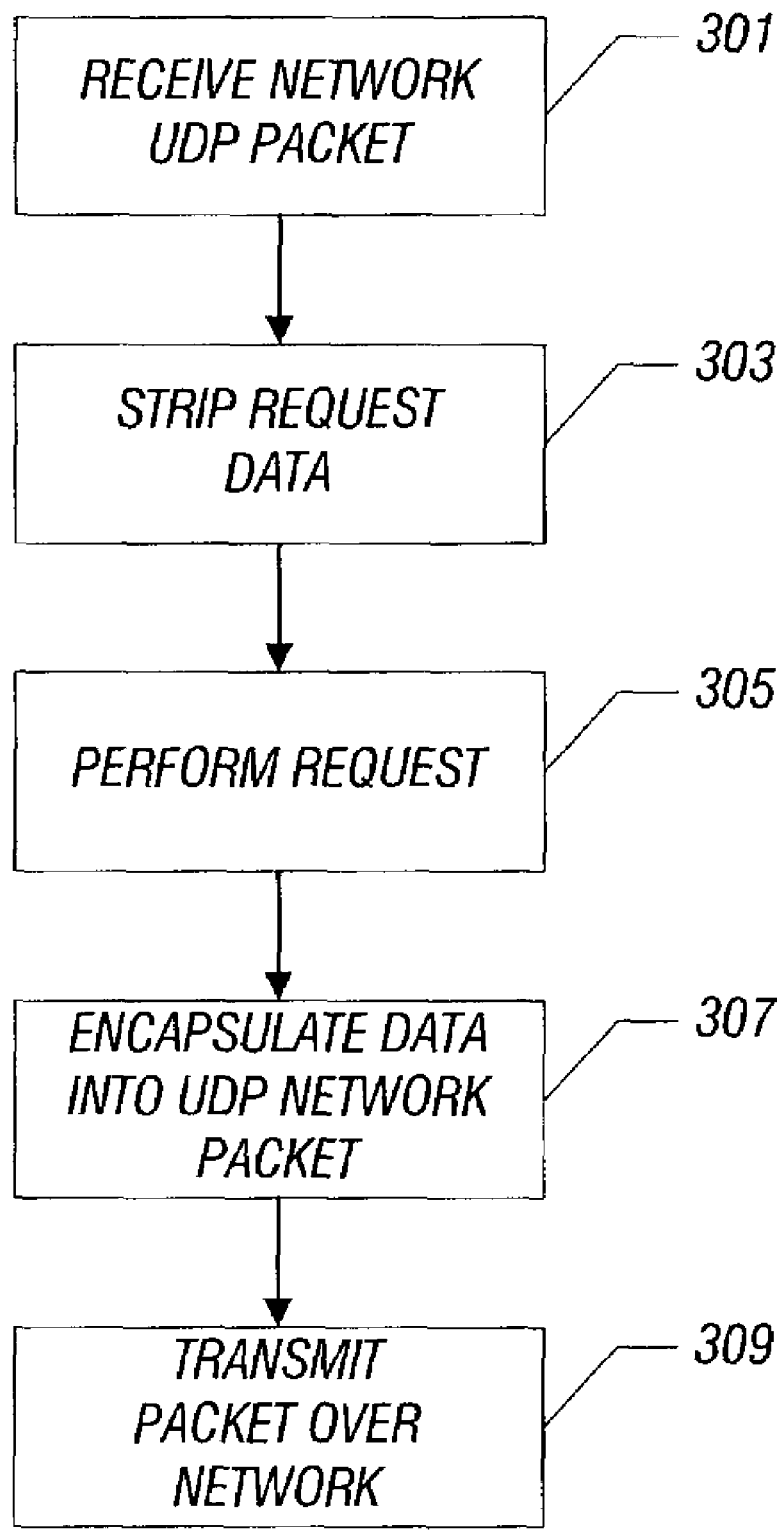
FIG. 3 illustrates a flow chart that may be utilized by a host computer in accordance with embodiments of the present invention.

Referring now to FIG. 3, a flow chart that may be utilized by a host computer, such as host computer 107, is illustrated in accordance with embodiments of the present invention. The host computer 107 may receive network UDP packets 301 and then strip the virtual data requests from the packet 303.

Host computer 107 may then perform the requested storage function 305, for example, a read or write request to a disk drive, and then encapsulate the data from the requested function into a UDP network packet 307 and transmit that packet over a network 309, such as network 105.

By utilizing the process, such as the process illustrated in FIG. 3, host computer 107 may provide to a computer, such as computer 101, a virtual or real disk and be able to send and receive data to computer 101 that may be utilized by computer 101 to boot an operating system or other software application.

Figure 4:
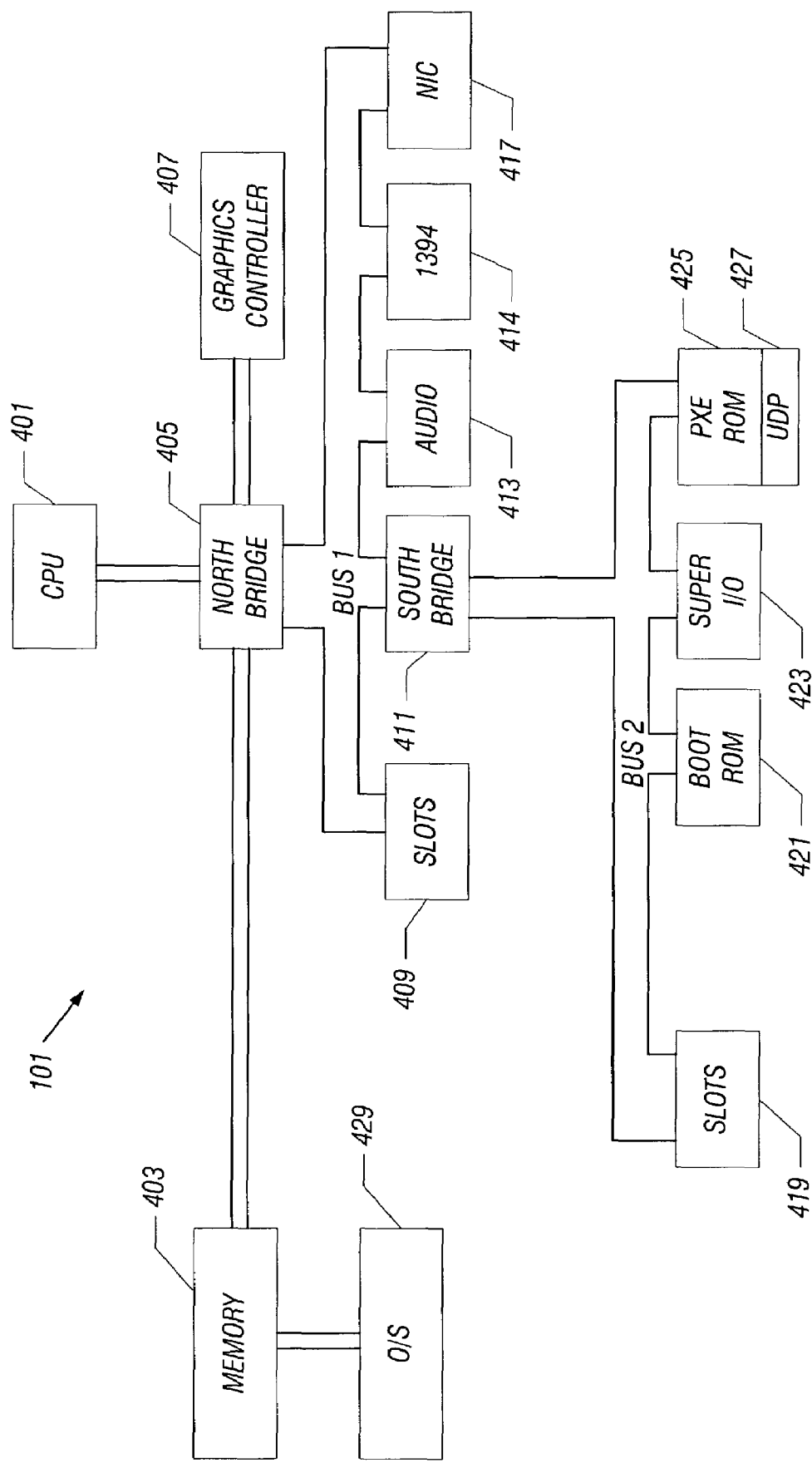
FIG. 4 illustrates a computer device in accordance with embodiments of the present invention.

Referring now to FIG. 4, a computer system 101 may include a central processing unit 401, one or more memory devices 403, and a bridge device such as north bridge 405. The north bridge 405 may be coupled to a graphics controller 407 that may, in some embodiments, be connected to the north bridge 405 through an advanced graphics processor (AGP) bus.

Additionally, north bridge 405 may be coupled through bus 1 to plug-in slots 409 that may be utilized, in some embodiments, to expand the computer resources. Additionally, north bridge 405 may be coupled through bus 1 to a second bridge device such as south bridge 411. North bridge 405 may also be coupled through bus 1 to various peripheral devices such as audio section 413, an IEEE 1394 interface device 414, and a network interface card (NIC) 417.

South bridge 411 may be coupled through bus 2 to devices such as expansion slots 419. In addition, south bridge 411 may be coupled to storage devices, such as a boot ROM 421, which may be a read only memory (ROM) such, in some embodiments, a Flash ROM. Additionally, in some embodiments, the south bridge 411 may be coupled to super I/O controller 423. Also, in like manner, south bridge 411 may be coupled to a PXE ROM 425, which may also include UDP drivers 427.

Memory 403 may be utilized to store various program instructions as may be utilized by CPU 401 or other CPUs (not shown) to control one or more functions of the computer system 101. Additionally, an operating system 429 may be downloaded from a network, such as network 105, through the network interface controller, such as 417. The operating system 429 may be wholly or in part stored in memory 403.

While the present invention has been described with respect to a limited number of embodiments, those skilled in the art will appreciate numerous modifications and variations therefrom. It is intended, therefore, that the appended claims cover all such modifications and variations as fall within the true spirit and scope of this present invention.

What is claimed is:

1. A computer-implemented method comprising:
   issuing a storage request by a first computer having a processor, the storage request being issued while the processor is operating in real mode;
   without exiting real mode operation, emulating a physical local storage device responsive to the storage request by utilizing, in part, one or more UDP packets;
   without exiting real mode operation, utilizing, in part, a UDP packets to load an operating system from the emulated physical local storage device, in part, into a memory coupled to the processor; and booting the operating system by the processor.

2. The method as in claim 1 further comprising utilizing a network to send and receive the UDP packets.

3. The method as in claim 1 further comprising encapsulating the storage request into one or more UDP packets.

4. The method as in claim 3 further comprising encapsulating the storage request, in part, in response to a call to a BIOS interrupt for disk I/O.

5. The method as in claim 2 further comprising a second computer receiving the UDP packets and sending a UDP packet containing storage data to the processor.

6. The method as in claim 5 further comprising the second computer sending UDP packets containing an operating system to the first computer.

7. The method as in claim 6 further comprising the second computer sending UDP packets containing virtual storage device drivers.

8. The method as in claim 7 further comprising the first computer utilizing the virtual storage device drivers.

9. The method as in claim 3 further comprising the first computer utilizing one or more instructions stored in a ROM to encapsulate the storage request into a UDP packet.

10. An apparatus comprising:
a first computer having a processor and a memory coupled to the processor, wherein the processor executes a program stored in the memory while the processor is operating in real mode;
the program utilizing a BIOS interrupt for disk I/O to service, in part, disk I/O requests; and
the BIOS interrupt coupled to one or more instructions that convert the disk I/O requests into a virtual disk requests utilizing, in part, UDP packets,
wherein the first computer receives a protected mode operating system in response to the virtual disk requests, and wherein the processor does not exit real mode operation at least until the first computer receives the protected mode operating system.

11. The apparatus as in claim 10 wherein UDP packets are received by the first computer and utilized, in part, to load the protected mode operating system into the memory.

12. The apparatus as in claim 10 wherein the processor utilizes virtual disk drivers associated with the protected mode operating system.

13. The apparatus as in claim 10 wherein the disk I/O requests are converted into UDP packets utilizing one or more instructions stored in a ROM coupled to the processor.

14. The apparatus as in claim 11 wherein the UDP packets are sent and received over a network.

15. A system comprising:
a first computer having a processor and a program executing thereon, the processor executing the program while operating in real mode;
the program sending and receiving disk I/O requests;
one or more instructions executing on the processor operative to convert the disk I/O requests into UDP packets;
a network interface coupled to the processor operative to send and receive the UDP packets over a network; and
a second computer operative to receive UDP packets from the first computer and send UDP packets to the first computer, in part, in response to received UDP packets, the UDP packets sent by the second computer containing operating system instructions, wherein the processor does not exit real mode operation at least until the first computer receives the operating system instructions.

16. The system as in claim 15 wherein the first computer utilizes virtual disk drivers associated with the protected mode operating system.

17. The system as in claim 15 wherein the disk I/O requests are converted into UDP packets utilizing one or more instructions stored in a ROM coupled to the processor.

18. An apparatus comprising:
a processor operating in real mode coupled to means for converting storage requests utilizing a BIOS interrupt for disk I/O into UDP packets;
means for sending the UDP packets over a network;
means for receiving UDP packets from the network;
means for extracting operating system instructions from the received UDP packets; and
means for booting a protected mode operating system based on the extracted operating system instructions, wherein the processor does not exit real mode operation at least until executing the extracted operating system instructions.

19. The apparatus as in claim 18 wherein the means for converting the storage requests utilizes one or more instructions stored in a ROM.

20. The apparatus as in claim 18 wherein a computer receives the UDP packets sent over the network and sends operating system instructions in UDP packets over the network.

* * * * *